(12) United States Patent
Preisler et al.

(10) Patent No.: US 11,540,059 B2
(45) Date of Patent: Dec. 27, 2022

(54) VIBRATING PANEL ASSEMBLY FOR RADIATING SOUND INTO A PASSENGER COMPARTMENT OF A VEHICLE

(71) Applicant: JVIS-USA, LLC, Shelby Township, MI (US)

(72) Inventors: Darius J. Preisler, Macomb, MI (US); Jason T. Murar, Shelby Township, MI (US); Robert C. Koehn, II, Roseville, MI (US); Alexis Antonio Silva Perez, Macomb, MI (US)

(73) Assignee: JVIS-USA, LLC, Shelby Township, MI (US)

( * ) Notice: Subject to any disclaimer, the term of this patent is extended or adjusted under 35 U.S.C. 154(b) by 0 days.

(21) Appl. No.: 17/333,176

(22) Filed: May 28, 2021

(65) Prior Publication Data

US 2022/0386040 A1 Dec. 1, 2022

(51) Int. Cl.
*H04R 7/04* (2006.01)
*H04R 7/10* (2006.01)
(Continued)

(52) U.S. Cl.
CPC ........... *H04R 23/00* (2013.01); *B60R 13/025* (2013.01); *H04R 7/045* (2013.01); *H04R 7/10* (2013.01);
(Continued)

(58) Field of Classification Search
CPC ............. H04R 7/04; H04R 7/045; H04R 7/06
See application file for complete search history.

(56) References Cited

U.S. PATENT DOCUMENTS 4,362,907 A 12/1982 Polacsek
4,385,210 A 5/1983 Marquiss
(Continued)

FOREIGN PATENT DOCUMENTS

GB 2492100 A 12/2012

OTHER PUBLICATIONS

Jong Jin Park, et al., Giant Acoustic Concentration by Extraordinary Transmission in Zero-Mass Metamaterials, Institute of Physics and Applied Physics, Yonsei University, Seoul 120-749, Korea, Department of Physics, Ewha Womans University, Seoul 120-750, Korea, Division of Applied Physics, Faculty of Engineering, Hokkaido University, Sapporo 060-8628, Japan, published Jun. 13, 2013.
(Continued)

*Primary Examiner* — Mark Fischer
(74) *Attorney, Agent, or Firm* — Brooks Kushman P.C.

(57) ABSTRACT

A vibrating panel assembly configured to radiate sound into a passenger compartment of a vehicle having a support structure is provided. The assembly includes a substrate panel having front and back surfaces. The panel includes an inner portion, an outer boundary portion formed on the perimeter of the panel and an intermediate portion between the inner portion and the outer boundary portion. The vibrating panel has a frequency distribution of modes in a range of audible frequencies. The panel is configured to be attached to the support structure. An electroacoustic vibrator is mounted on the inner portion at the back surface at a predetermined location and is configured to vibrate the panel over the range of audible frequencies in response to an electrical signal. The intermediate portion is configured to increase modal density of the panel.

18 Claims, 12 Drawing Sheets

(51) Int. Cl.
*H04R 23/00* (2006.01)
*B60R 13/02* (2006.01)

(52) U.S. Cl.
CPC .. *B60R 2013/0287* (2013.01); *H04R 2499/13* (2013.01)

(56) References Cited

U.S. PATENT DOCUMENTS

| | | | |
|---|---|---|---|
| 4,499,340 A | 2/1985 | Kasai et al. | |
| 4,514,599 A | 4/1985 | Yanagishima et al. | |
| 4,550,422 A | 10/1985 | VanPelt et al. | |
| 4,551,849 A | 11/1985 | Kasai et al. | |
| 4,720,867 A | 1/1988 | Imai et al. | |
| 4,792,978 A | 12/1988 | Marquiss | |
| 4,856,071 A | 8/1989 | Marquiss | |
| 5,754,664 A | 5/1998 | Clark et al. | |
| 5,776,522 A | 7/1998 | Budnick | |
| 5,901,231 A | 5/1999 | Parrella et al. | |
| 6,181,797 B1 | 1/2001 | Parrella et al. | |
| 6,215,884 B1 | 4/2001 | Parrella et al. | |
| 6,320,967 B1 | 11/2001 | Azima et al. | |
| 6,324,294 B1 | 11/2001 | Azima et al. | |
| 6,356,641 B1* | 3/2002 | Warnaka | H04R 5/02 381/86 |
| 6,377,695 B1* | 4/2002 | Azi | H04R 7/045 381/152 |
| 6,516,071 B1 | 2/2003 | Liu | |
| 6,522,755 B1 | 2/2003 | Warnaka et al. | |
| 6,639,988 B2 | 10/2003 | Ashtiani et al. | |
| 6,676,879 B1 | 1/2004 | Azima | |
| 6,694,036 B2 | 2/2004 | Makino | |
| 6,721,436 B1 | 4/2004 | Bertagni et al. | |
| 6,760,461 B2 | 7/2004 | Azima et al. | |
| 6,826,285 B2 | 11/2004 | Azima | |
| 6,865,277 B2 | 3/2005 | Bank et al. | |
| 7,050,593 B1 | 5/2006 | Emerling et al. | |
| 7,088,836 B1 | 8/2006 | Bachmann et al. | |
| 7,194,098 B2* | 3/2007 | Azima | B60R 11/0217 381/431 |
| 7,684,577 B2 | 3/2010 | Arai et al. | |
| 7,817,810 B2 | 10/2010 | Cheung | |
| 7,916,878 B2 | 3/2011 | Bank et al. | |
| 8,073,156 B2 | 12/2011 | Hutt et al. | |
| 8,090,116 B2 | 1/2012 | Holmi et al. | |
| 8,155,344 B2 | 4/2012 | Iimori et al. | |
| 8,208,655 B2 | 6/2012 | Kim et al. | |
| 8,594,362 B2 | 11/2013 | Liu | |
| 8,942,392 B2 | 1/2015 | Cheung | |
| 9,154,862 B2 | 10/2015 | Cheung | |
| 9,326,053 B2 | 4/2016 | Nedelman | |
| 9,725,047 B2 | 8/2017 | Orellana et al. | |
| 9,834,320 B2 | 12/2017 | Lucas et al. | |
| 9,888,319 B2 | 2/2018 | Soulodre | |
| 9,967,692 B2 | 5/2018 | Dublin et al. | |
| 10,252,802 B2 | 4/2019 | Cheung | |
| 10,841,704 B2 | 11/2020 | Landick | |
| 2002/0081980 A1 | 6/2002 | Reus | |
| 2003/0035560 A1 | 2/2003 | Harris et al. | |
| 2003/0053642 A1* | 3/2003 | Bank | H04R 1/028 381/86 |
| 2004/0047476 A1 | 3/2004 | Sato | |
| 2004/0156515 A1 | 8/2004 | Harris et al. | |
| 2005/0018865 A1 | 1/2005 | Azima et al. | |
| 2005/0084131 A1* | 4/2005 | Fordham | H04R 7/045 381/431 |
| 2007/0086616 A1 | 4/2007 | Bank et al. | |
| 2014/0355793 A1 | 12/2014 | Dublin et al. | |
| 2015/0358725 A1 | 12/2015 | Hera et al. | |
| 2016/0014522 A1* | 1/2016 | Matsumura | H04R 7/18 29/896.23 |
| 2016/0080881 A1 | 3/2016 | Dublin et al. | |
| 2017/0034622 A1 | 2/2017 | Hera et al. | |
| 2017/0150288 A1 | 5/2017 | Dublin et al. | |

OTHER PUBLICATIONS

Benjamin Zenker, et al., Improved Sound Radiation of Flat Panel Loudspeakers Using the Local Air Spring Effect, Applied Sciences, Chair of Acoustic and Haptic Engineering, Technical University of Dresden, Helmholtzstrasse 18, 01069 Dresden, Germany; robert.schurmann@tu-dresden.de (R.S.); sebastian.merchel@tu-dresden.de (S.M.); ercan.altinsoy@tu-dresden.de (M.E.A.), published Dec. 14, 2020.

* cited by examiner

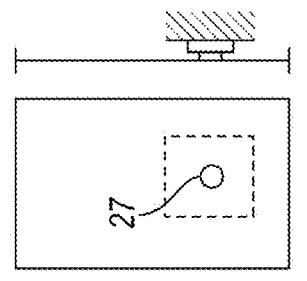
FIG. 16D
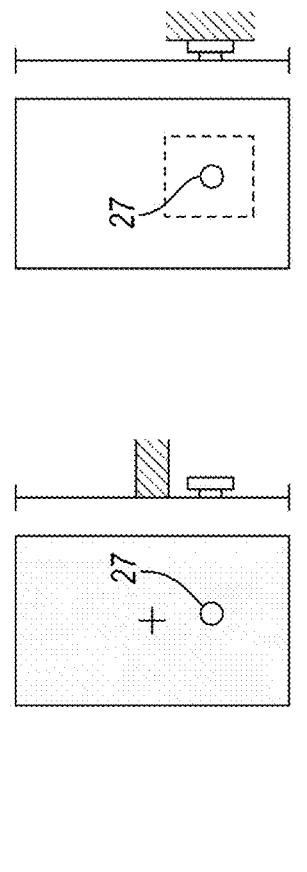
FIG. 16C
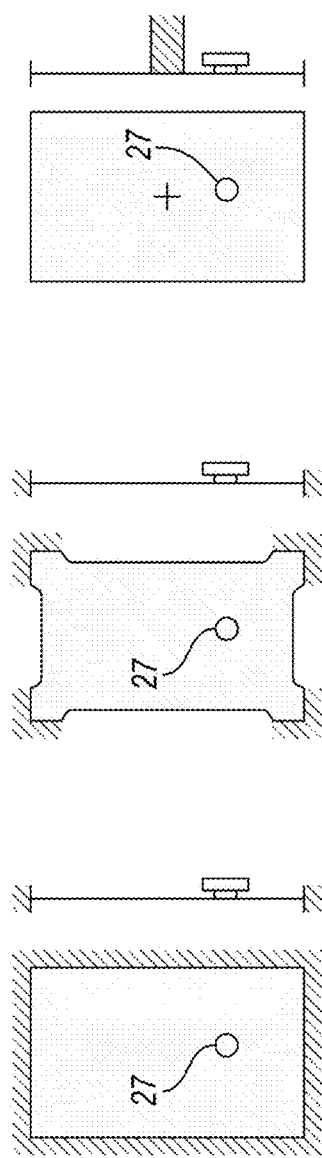
FIG. 16B
FIG. 16A
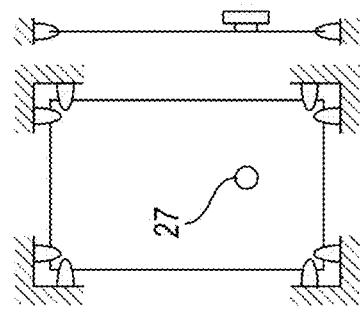
FIG. 16G
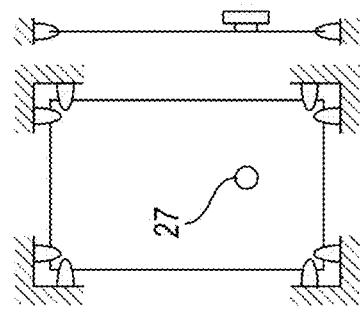
FIG. 16F
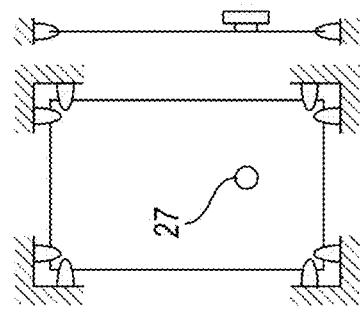
FIG. 16E

VIBRATING PANEL ASSEMBLY FOR RADIATING SOUND INTO A PASSENGER COMPARTMENT OF A VEHICLE

TECHNICAL FIELD

This invention generally relates to vehicular audio systems having improved sound quality and, in particular, to such systems which have at least one electroacoustic vibrator-driven, substrate panel with improved frequency response.

OVERVIEW

Sound waves are longitudinal mechanical waves. They can be propagated in solids, liquids, and gases. The material particles transmitting such a wave oscillate in the direction of propagation of the wave itself. There is a large range of frequencies within which longitudinal mechanical waves can be generated, sound waves being confined to the frequency range which can stimulate the human ear and brain to the sensation of hearing. This range is from about 20 cycles/sec (i.e. Hz) to about 20,000 cycles/sec (i.e. Hz) and is called the audible range.

Audible waves originate in vibrating strings (violin, human vocal cords), vibrating air columns (organ, clarinet), and vibrating plates and membranes (xylophone, loudspeaker, drum). All of these vibrating elements alternately compress the surrounding air on a forward movement and rarefy it on a backward movement. The air transmits these disturbances outward from the source as a wave. Upon entering the ear, these waves produce the sensation of sound. Waveforms which are approximately periodic or consist of a small number of approximately periodic components give rise to a pleasant sensation (if the intensity is not too high), as, for example, musical sounds. Sound whose waveform is nonperiodic is heard as noise.

Vibrating rods, plates, and stretched membranes give rise to sound waves. Consider a stretched flexible membrane, such as a drumhead. If it is struck a blow, a two-dimensional pulse travels outward from the struck point and is reflected again and again at the boundary of the membrane. If some point of the membrane is forced to vibrate periodically, continuous trains of waves travel out along the membrane. Just as in the one-dimensional ease of a string, so here too standing waves can be set up in the two-dimensional membrane. Each of these standing waves has a certain frequency natural to (or characteristic of) the membrane. Again, the lowest frequency is called the fundamental and the others are overtones. Generally, a number of overtones are present along with the fundamental when the membrane is vibrating. These vibrations may excite sound waves of the same frequency.

The nodes of a vibrating membrane are lines rather than points (as in a vibrating string) or planes (as in a pipe). Since the boundary of the membrane is fixed, the line is a nodal line. In general, all elastic bodies will vibrate freely with a definite set of frequencies for a given set of boundary or end conditions. These frequencies are called proper frequencies, characteristic frequencies, or eigenfrequencies of the system.

Referring now to FIGS. 9 and 10, exciters typically consist of a motor assembly, a voice coil, a suspension system, electrical connection terminals, and a coupling plate or ring that joins the voice coil to the mounting surface (left hand side of FIG. 9).

Unlike a loudspeaker (right hand side of FIG. 9) that uses a frame and a cone diaphragm to couple vibrations to the surrounding air, the exciter 27 uses the movement of itself to apply force from the voice coil to the mounting panel surface, which is usually flexible enough to vibrate and produce sound.

The exciter works by exciting a panel surface at a single point. Unlike a loudspeaker driver, where the cone moves essentially in unison with the voice coil, most panels are not rigid enough to conduct the exciter's force evenly across their entire surface area, so they often vibrate in a chaotic manner as longitudinal sound waves travel through the panel itself. The material type, exciter placement, and edge termination of the panel all affect the sound properties of a panel, though exciters can give acceptable results when mounted on nearly any kind of panel.

Referring now to FIGS. 15A-15D, once the mounting panel material, shape and size are known, one or more exciters can be placed on the panel. Exciter placement is important to achieving great sound. For the best results, exciters should be placed near the center of the panel, but should be offset from each edge of the panel so that the distance from the exciter to the edge is not an even multiple of the distance from the exciter to another edge of the panel, in order to avoid the buildup of standing waves. For mounting exciters to a flat rectangular panel, the width of the panel should be less than ⅘ of the height, or vice versa, and good results will be given with the exciter mounted a distance of ⅖ of the panel width from one side of the panel, and ⅗ from the other side of the panel, with the same relationship used for exciter placement with respect to the panel height.

If multiple exciters are needed (as shown in FIGS. 15A-15D) for a panel or surface, it is not recommended to space the exciters evenly across the surface. This will result in very narrow sound dispersion at upper, midrange and treble frequencies. Instead, place the exciters together in a group, with exciters at unequal distances from the panel edges and from one another.

Referring now to FIGS. 16A-16G, the benefit of compliantly suspending part or all of the panel is a reduction in the internally reflected energy, because some of the energy is transmitted into the compliant material and does not get reflected. Compliant suspension of the panel edges may be accomplished using a soft material like foam tape, a silicone adhesive bead, a flexible rubber member or a flexible plastic.

Traditionally, individual moving coil and cone loudspeakers are placed within the doors, instrument panel, and rear tray and elsewhere in a vehicle for providing sound within the vehicle. These speakers add substantial weight to a vehicle, require individual installation and connection, occupy valuable interior trim space, allow significant road noise intrusion, and are subject to substantial shock and environmental abuse.

Most significantly, they are poorly positioned for listening. Their on-axis radiation is typically directed low in the vehicle towards occupant's legs and midsections rather than at the occupant's ears. The direct sound from the speaker to the listener is typically far off-axis and highly variable in frequency response with typically insufficient high frequencies. In the high noise environment of a vehicle, this typically results in mid and high frequency audio information getting lost. "Imaging", the perception of where sound is coming from, is also adversely affected since the loudspeakers are low in the vehicle; for the front passengers, the audio image is pulled down into the doors while the rear passengers have an image to the side or rear instead of what should be presented in front of them.

As a solution to this problem, some proposed systems, including the system described in the U.S. patent to Clark et al., U.S. Pat. No. 5,754,664, have incorporated small, lightweight loudspeaker drivers above the occupants in the headliner in addition to the door and rear package tray speakers. Unfortunately, the small loudspeaker can still be localized due to the fact that the listener is far enough to be in the free field of acoustic radiation but not far enough to be experiencing a plane wave condition.

This phenomenon, as documented by Soren Bech and others results in an unnatural simulation of an acoustic space. S. Bech, "Electroacoustic Simulation of Listening Room Acoustics. Psychoacoustic Design Criteria," Audio Engineering Society, $89^{th}$ Convention 21-25 Sep. 1990, Los Angeles, USA, 34 pages. The most significant drawback of this approach, however, is that the overall system complexity and cost is increased due to the addition of individual drivers overhead while the conventional speakers still remain in the doors and rear package tray. Furthermore, the noise paths through the door and rear package trays still exist and more noise paths from the roof (as occurs in rain) are opened with the new lightweight cone speakers in the headliner. Lastly, making the drivers invisible would be extremely difficult, since the small speakers are mounted onto the headliner; even if acoustically transparent fabric were placed over the drivers, the holes in the headliner would result in "read-thru" or visibility.

The Verity Group PLC and its successors have applied for a number of patents covering various aspects of flat panel loudspeaker (i.e., NXT) technology. The technology operates on the principle of optimally distributive modes of vibration. A panel constructed in accordance with this technology has a very stiff structure and, when energized, develops complex vibration modes over its entire surface. The panel is said to be dispersive in that the shape of the sound wave traveling in the panel is not preserved during propagation.

Unfortunately, distributed mode panel loudspeakers require precise geometries for exciter placement and panel suspension thus limiting their size and integration capabilities into a headliner. Essentially, they would be separate speakers assembled into a hole in the headliner or onto the surface of the headliner. In the first case, they would also result in extra noise transmission (since the panels are extremely light) or in the second case, they would be visible to the occupants either as bumps or edges in typical headliner covering materials. In both cases, added complexity is the result.

From a sonic performance viewpoint, distributed mode panels suffer from poor low frequency response (typically restricted to 250 Hz and above for sizes integral to a headliner) and low output. Neither of these conditions make NXT panels suitable for headliner applications, particularly in a high noise environment. Furthermore, distributed mode panels are incapable of precise imaging, presenting instead a diffuse acoustic field perception where the sound appears to come form everywhere. While distributed mode panels might improve overall spaciousness, they would still require full range loudspeakers in the doors or rear package tray for sufficient acoustic output and other speakers in front for proper imaging.

In the U.S. patent to Parrella et al. U.S. Pat. No. 5,901,231, driving portions of interior trim with piezo-electric elements to reproduce audio frequencies is disclosed. However, the use of piezo-electric elements restricts them to dividing up the trim into different sections for different frequency ranges adding complexity to the system. Furthermore, the excursion limits of piezo elements limits the output level and low frequency range of the trim panels such that conventional cone speakers would be required to produce lower frequencies. The piezo elements also require complicated integration into the trim element and are difficult to service. Lastly, the piezo elements require additional circuitry to convert typical output from an automotive head unit further complicating the system.

The above-noted application entitled "Integrated Panel Loudspeaker System Adapted To Be Mounted In A Vehicle" describes flat panel systems with an electromagnetic drive mechanism integrated into an aperture in the panel. However, the driving mechanism that is integrated into the panel is constructed without steel pieces to contain, direct and concentrate the magnetic flux to its best advantage. The voice coil required is also relatively massive severely limiting the high frequency output. Thus, the output level is not adequate for typical audio performance. Furthermore, the aperture that the electromagnetic drive mechanism is insufficiently stiff to produce high frequency output.

The U.S. patents to Marquiss U.S. Pat. Nos. 4,385,210, 4,792,978 and 4,856,071 disclose a variety of planar loudspeaker systems including substantially rigid planar diaphragms driven by cooperating coil and magnet units.

The prior art discloses attempts to incorporate the exciter of a flat panel speaker design onto a trim panel using the trim element itself as the vibrating diaphragm. However, significant difficulties have been encountered in this approach. For example, U.S. Pat. No. 7,050,593 illustrates use of an automotive panel as the sound surface for a flat panel speaker. U.S. Pat. No. 6,377,695 similarly discloses an exciter attached to vehicle roof lining, door panels, dashboards, and rear parcel shelves, and it discloses foam materials for the radiating sound surface. Other materials typically used for the disclosed trim surfaces include glass-filled urethane foam and molded plastics such as PVC and PPO. Thus, the typical materials used for automotive trim surfaces tend to be sound absorbent and are far from ideal for use to propagate sound.

A further problem associated with existing deployments of flat panels in interior trim panels relates to damping and isolation. By mounting an exciter directly to the backside of a headliner or other trim panel substrate, the sound production area (i.e., the region where panel vibrations generate sound) may extend to other assembled components on the panel (e.g., lighting components, panel attachment points, and electrical accessories) which may adversely affect the resonance of the acoustic surface and its ability to reproduce sound.

Yet another problem associated with known arrangements relates to inefficiency of the resulting speaker. The exciter must overcome its own mass when energized due to the fact that it is solely supported by its attachment with the panel surface. This limits voice coil excursion and the subsequent transmission of sound into the acoustic sound surface.

Despite the above problems, flat-panel loudspeakers are becoming increasingly important for today's consumer market. The invisible integration, wide and diffused radiation and improved room interaction are features of flat-panel loudspeakers, for improving the perceived audio quality. Furthermore, large and more powerful devices can be integrated without disturbing customers' views or disrupting the aesthetics of a room. However, in addition to invisible integration, flat-panel loudspeakers must possess acoustic quality that is comparable to that of conventional systems. Customers of audio devices expect that the audio signal can be reproduced at a sufficient amplitude and quality. The acoustic quality can be expressed in terms of frequency limits, the maximum sound pressure level, the flatness of the pressure response, the harmonic and nonlinear distortions and the radiation characteristics.

U.K. published patent application 2,492,100 discloses a method of fabricating an illuminated trim panel member in which the panel member comprises a trim element. The method comprises: forming, such as by laser drilling, at least one aperture completely through the trim element; and applying a layer of a light-transmitting coating medium to one side of the trim element to cover at least a portion of the one side and the aperture, whereby light may be transmitted completely through the aperture and through the layer of coating medium for viewing.

As described in Chapter 13 of the Handbook of Laser Materials Processing entitled "Hole Drilling," there are two ways of forming apertures or holes using laser beams: percussion drilling and trepanning. Percussion drilling is typically used for hole diameters less than 0.025 in. (0.63 mm), while trepanning is used for drilling holes of larger diameter.

Trepanning

If one uses a rotating optical device, holes up to ≈0.250 in. (6.25 mm) diameter can be laser drilled. So-called "boring heads" rotate the focused laser beam at very high rates. Holes are drilled by either a single pass or multiple passes of the laser beam.

Drilling by trepanning is to cut a hole around its periphery. Depending on the hole diameter, a slug may be produced. Boring heads usually use 2.5-in. focal length lenses and are equipped with gas jets similar to those used for laser cutting applications.

Roundness of the holes produced by boring heads is exact, and repeatability of hole diameter is excellent. Boring-head-hole diameter is established either manually or by use of a programmable controller.

Trepanned holes can also be drilled by interpolation of linear axes, moving either the material or the laser focusing device. Speed of drilling by interpolation is dictated by the size of the linear axes. The linear axes servo system must be properly tuned to produce circular holes. Specialty beam-manipulation devices use very small linear axes to move the focusing device in a circle. The system controller can be programmed to establish desired hole diameters.

Most nonmetals are of one of two types, characterized by their response to exposure to high-energy radiation: those that transform from a solid directly into a vapor without significant liquefaction, and those that transform from solid state into a liquid state before vaporization. Paper is an example of the former; acrylic resin is an example of the latter.

When absorbed by a material, this energy is transformed into energy associated with the motion of atoms or molecules and is capable of being transmitted through solids or fluids by conduction, that is, as heat. Most nonmetals do not conduct heat effectively. Properly applied, the effect of short, high-energy laser pulses is localized to the area of exposure. As such, each pulse of laser energy affects a volume of material consistent with the irradiance of the focuses beam and the specific heat of the material, with negligible impact to material adjacent to the area of exposure.

The total energy required to drill a hole comes from the specific gravity of a material and the volume of material which must be converted from solid to vapor. The rate at which holes can be drilled is determined by the rate at which energy can be input to the material without degrading hole quality.

Hole quality is quantified by the measures of roundness and taper; recast (material that has resolidified in the hole or around the hole entrance); or charring (usually exhibited as a carbonaceous residue). These qualities affect the function of the hole, whether it be air flow, spray pattern, or part fit.

Many molded parts are used in the interior of vehicles. The substrate of the part is often made of plastic or of a fibrous molding material.

Natural fiber composite panels utilized as a substrate have very important characteristics because of their light weight and high environmental sustainability.

The substrate of the molded part may be realized in a laminar fashion and has an essentially plane contour or a three-dimensional contour with convex and concave regions defined by the respective design, as well as, if applicable, one or more openings and recesses. In order to fix the molded parts in the passenger compartment or on the vehicle door and to mount handles, control elements and storage trays on the molded part, the molded part is also equipped with mounting parts that are also referred to as retainers.

The substrate typically consists of plastics or composite materials that contain plastics such as acrylonitrile-butadiene-styrene (ABS) or polypropylene (PP). Fibrous molding materials on the basis of textile fabrics of hemp, sisal, flax, kenaf, and/or wood components such as wood fibers, wood dust, wood chips or paper bound with duroplastic binders are likewise used as material for the substrate. Foamed materials of polyurethane or epoxy resins that, if applicable, are reinforced with natural fibers or glass fibers may also be considered as material for the substrate.

The side of the respective molded part or substrate that faces the vehicle interior is usually referred to as the visible side. In order to provide the visible side with an attractive appearance, the substrate is equipped with one or more decorative elements of a textile material or a plastic film. The plastic films are used for this purpose are usually colored and have a relief-like embossed surface. If applicable, the decorative elements comprise a cushioning layer of a foamed plastic that faces the substrate and provides the molded part with pleasantly soft haptics. The decorative elements are usually laminated onto the substrate or bonded thereto during the manufacture of the substrate by means of thermoplastic back-injection molding.

On its edge and/or on an installation side that lies opposite of the visible side, the substrate is advantageously equipped with projections, depressions and bores. The projections, depressions and bores serve for non-positively connecting the molded part to sections of the car body such as a car door or the roof of a passenger compartment by means of retaining elements such as clips, pins and screws.

The term "facing material" refers to a material used to conceal and/or protect structural and/or functional elements from an observer. Common examples of facing materials include upholstery, carpeting, and wall coverings (including stationary and/or movable wall coverings and cubicle wall coverings). Facing materials typically provide a degree of aesthetic appearance and/or feel, but they may also provide a degree of physical protection to the elements that they conceal. In some applications, it is desirable that the facing material provide properties such as, for example, aesthetic appeal (for example, visual appearance and/or feel) and abrasion resistance. Facing materials are widely used in motor vehicle construction and may include leather.

Leather is a general term for tanned hides whose original fiber structure is retained substantially intact. Excluding splits or parts of the skin that were removed prior to tanning and are not used as automobile leather on principle, the leather comprises a grain layer, or top skin, and a dermis. The top skin makes up only a fraction of the total thickness of the leather.

Difficulties have arisen in attempting to use leather on molded parts or substrates. First, natural leather is a non-uniform material whose thickness, tear strength and surface finish vary over a wide range. Attempts have been made to glue or otherwise adhere pieces of leather over molded or other preformed vehicle interior parts. Difficulties have also arisen in obtaining proper adhesion of the leather to the preformed part. The leather will loosen and/or peel away from the underlying part over time.

Other attempts have incorporated leather sheets or otherwise made from multiple leather pieces. However, such products have required raised, sewn seams and have not provided the desired smooth finished leather look desired by vehicle manufacturers. Moreover, the labor intensive costs associated with producing such covers have been high.

A concurrent problem in the use of leather covered, molded articles generally have been the inability to obtain a proper leather grain appearance on the exposed surface of the article. Manufacturing procedures in applying leather covers to preformed articles with adhesives and the like have often diminished the naturally appearing grain in the leather and provided an almost smooth appearance instead of the desired natural leather grain. In addition, it has been difficult with past procedures to properly adhere the leather to a preformed article such that the leather remains secured to the article for proper appearance over its life.

In the automotive industry, it is common practice to refer to various surfaces as being A-, B-, or C-surfaces. As used herein, the term "A-surface" refers to an outwardly facing surface for display in the interior of a motor vehicle. This surface is a very high visibility surface of the vehicle that is most important to the observer or that is most obvious to the direct line of vision. With respect to motor vehicle interiors, examples include dashboards, door panels, instrument panels, steering wheels, head rests, upper seat portions, headliners, load floors and pillar coverings.

According to classic acoustic theory, there are a number of requirements which, when met, result in good acoustics as follows:

Appropriate reverberation time (i.e. must be substantially the same throughout the entire frequency range);

Uniform sound distribution (i.e., where the sound must be able to be heard equally well everywhere in a room or vehicle cabin);

Appropriate sound level (i.e., normal conversation is 60-65 dB, and in a busy street 70-85 dB).

Appropriate, low background noise (i.e., is one of the most important acoustic criteria). In a vehicle cabin, the background noise may come from ventilation systems.

No echo or flutter echoes (i.e., must occur for the acoustics to be good).

As described in paper entitled "Improved Sound Radiation of Flat Panel Loudspeakers Using the Local Air Spring Effect," Zemker, B. et al., Appl. Sci., 2020, 10, 8926, flatness of the frequency response is essential to the listener. Flat panel loudspeakers have higher deviations than conventional systems. In particular, in the low-frequency range, the modal density is low on the logarithmic frequency sale. To optimize the spectrum of flat panel loudspeakers, the distance between the modal frequencies is optimized to give the illusion of a continuous spectrum. However, in many cases, it is not possible to increase the modal density in the low frequency range: the material properties, the thickness of the panel and the design are fixed. Therefore, the lack of a low-frequency response needs to be resolved by construction or excitation. Deviations of more than 20 dB in the lower frequency range are possible. The deviations decrease for higher frequencies.

Several constructive and control approaches have already been developed to improve the flatness of flat-panel loudspeaker responses. It is known that the damping of the boundary conditions, as well as the stiffness and damping of the coupled air volume (panel volume) or individual attached concentrated masses, have a positive influence on the pressure response. Another sufficient control variable is the position of the exciter. This can be optimized with a numerical analysis to find the best excitation positions in a fast and automated way. The achievable effect is physical limited. A single force driver is not able to excite all eigenmodes in an efficient way. Consequently, individual modes are excited with different levels of intensity, which occurs due to the superposition as a flatter pressure response.

An alternative solution is the usage of an array of force drivers to selectively excite the lowest eigenmodes of the flexible panel. This construction enables the same acoustic performance as a conventional speaker within the array-addressable frequency region. However, it increases the costs and complexity due to the higher number of exciters and controlled outputs of the DSP.

The last approach is known as the paneled woofer design. A conventional woofer radiates into a small air gap between the panel and a separation plate and excites the panel uniformly. This results in a flat response, which is comparable to a conventional woofer design. This design is limited to higher frequencies and needs to be supplemented by an exciter.

The above-noted article by Zemker et al. introduced a new control variable-modal related air compliance. It is known via U.S. Pat. No. 6,553,124 that the spring of the panel volume has a strong modal-dependent influence and can shift modes individually based on their effective radiating area. The different local air compliance of an irregular shaped enclosure was used to change the mode shape of the individual structural modes and suppress the panel's anti-phase components. Compared to a simple cuboid enclosure, the irregular shaped enclosure created local pressure changes that cause a local panel stiffening. This minimized dips and improved the frequency response without adding mass to the system. In other words, the above article by Zemker et al. introduced an approach to improve the frequency response of an exciter-driven flat-panel loudspeaker. The introduced modal-related air compliance was used to suppress modes with a high amount of anti-phase components. This was realized with a separation plate, which was mounted at a certain distance directly behind the panel to create an irregular shaped enclosure. The panel was stiffened due to the additional air spring caused by the paneled volume leading to a flatter transfer function.

The following U.S. patent documents are related to at least one embodiment of the present invention: 10,252,802; 9,834,320; 9,154,862; 8,942,392; 8,594,362; 7,817,810; 2003/0035560; 6,639,988; 9,967,692; 9,888,319; 2005/0018865; 2007/0086616; 2017/0150288; 2017/0034622; 2016/0080881; 2015/0358725; 2014/0355793; 8,090,116; 8,073,156; 7,088,836; 9,326,053; 10,841,704; 7,194,098; 6,826,285; 6,760,461; 6,865,277; 6,676,879; 6,522,755; 6,516,071; 6,356,641; 6,324,294; 6,320,967; 6,215,884; 6,181,797; 9,725,047; 7,916,878; 7,684,577; 8,208,655; 8,155,344; 2004/0047476; 2004/0156515; 6,721,436; 6,694,036; 2002/0044668; 2002/0081980; 4,720,867; 4,551,849; 4,514,599; 4,550,422; 4,362,907; and 4,499,340.

Thus, even with the above prior art advancements in speaker technology, prior vehicular audio systems have not been significantly simplified. There is still a need to reduce part count, labor cost, decrease weight, decrease exterior noise penetration, provide believable imaging, reduce speaker visibility, increase reliability, and provide easy serviceability.

It is therefore desirable to provide a vehicular audio system which satisfies at least some of the above-noted needs by using existing trim panel space and mounting techniques, advanced material property manipulation and processing and well-established psychoacoustic techniques.

SUMMARY OF EXAMPLE EMBODIMENTS

An object of at least one embodiment of the present invention is to provide a vibrating panel assembly wherein conventional full range cone loudspeakers located in pillars, doors, roofs, package trays, trunks, seats, and dashboards of a vehicle are replaced with at least one substrate panel driven by a hidden, electroacoustic vibrator thereby reducing weight, cost, and complexity of vehicular audio systems while freeing up valuable space formerly allocated for conventional speakers.

In carrying out the above object and other objects of at least one embodiment of the present invention, a vibrating panel assembly configured to radiate sound into a passenger compartment of a vehicle having a support structure is provided. The assembly includes a substrate panel having front and back surfaces. The panel includes an inner portion, an outer boundary portion formed on the perimeter of the panel and an intermediate portion between the inner portion and outer boundary portion. The panel is configured to be attached to the support structure. The vibrating panel has a frequency distribution of modes in a range of audible frequencies. An electroacoustic vibrator is mounted on the inner portion at the back surface of the panel at a predetermined location and is configured to vibrate the panel over the range of audible frequencies in response to an electrical signal applied to the vibrator. The intermediate portion is configured to increase modal density of the panel.

The panel may be formed as a unitary molded part from at least one plastic.

The panel may be a plastic molded panel.

The plastic molded panel may be injection molded.

The panel may comprise an automotive vehicle trim panel.

The panel may be concavely formed and the back surface of the panel may define a recess in which the vibrator is disposed.

The inner portion of the panel may have a flexural modulus lower than the flexural modulus of the outer boundary portion. The intermediate portion may be integrally formed via polymeric interfusion at an interface between the inner portion and outer boundary portion.

The vibrator may comprise an exciter.

The panel may be configured to be attached to a pillar of the support structure.

The intermediate portion may be made of an elastomeric material.

The intermediate portion may be scored with a plurality of slits.

The intermediate portion may be a substantially continuous line or groove which has a thickness less than the thickness of either the inner portion or the outer boundary portion.

The intermediate portion of the panel may be perforated with a plurality of holes.

The assembly may further include a continuous layer of facing material overlying and in contact with the front surface of the panel.

The facing material may include leather, vinyl, plastic, fabric or nylon.

The panel may be configured to be attached to a door of the support structure.

The panel may be configured to be attached to a roof of the support structure.

The assembly may further include a continuous layer of facing material overlying the front surface of the panel.

Further in carrying out the above object and other objects of at least one embodiment of the present invention, a low-profile vibrating panel assembly configured to radiate sound into a passenger compartment of a vehicle having a support structure is provided. The assembly includes a substrate panel having front and back surfaces. The panel includes a plurality of inner portions, an outer boundary portion formed on the perimeter of the panel and an intermediate portion between each inner portion and outer boundary portion. The panel is configured to be attached to the support structure. The vibrating panel has a frequency distribution of modes in a range of audible frequencies. The assembly includes an array of electroacoustic vibrators mounted on the inner portions of the panel at the back surface of the panel at predetermined locations. The vibrators are configured to vibrate the panel over the range of audible frequencies in response to electrical signals applied to the vibrators. The intermediate portions are configured to increase model density of the panel thereby operating to flatten a low frequency response of the panel.

Still further in carrying out the above object and other objects of at least one embodiment of the present invention, a low-profile vibrating panel assembly configured to radiate sound into a passenger compartment of a vehicle having a support structure is provided. The assembly includes a substrate panel having front and back surfaces. The panel includes an inner portion, an outer boundary portion formed on the perimeter of the panel and an intermediate portion between the inner portion and outer boundary portion. The panel is configured to be attached to the support structure. The vibrating panel has a frequency distribution of modes in a range of audible frequencies. A continuous layer of facing material overlies and is in contact with the front surface of the panel. An electroacoustic vibrator is mounted on the inner portion at the back surface of the panel at a predetermined location and is configured to vibrate the panel over the range of audible frequencies in response to an electrical signal applied to the vibrator. The intermediate portion is configured to increase modal density of the panel thereby operating to flatten a low-frequency response of the panel.

BRIEF DESCRIPTION OF THE DRAWINGS

FIG. 16A-16G show different possible rigid and compliant suspension locations for a vibrating, exciter-driven panel; FIG. 16A shows rigidly suspended panel edges; FIG. 16B shows rigidly suspended corners with free edges; FIG. 16C shows the panel rigidly suspended at a central location with free edges; FIG. 16D shows a compliant suspension at a central location with free edges; FIG. 16E shows a rigid suspension at a central location with compliantly suspended panel edges; FIG. 16F shows compliantly suspended panel edges; and FIG. 16G shows compliantly suspended corners with free edges; both exciter positions and suspension types and locations influence modal density.

DETAILED DESCRIPTION

Figure 1:
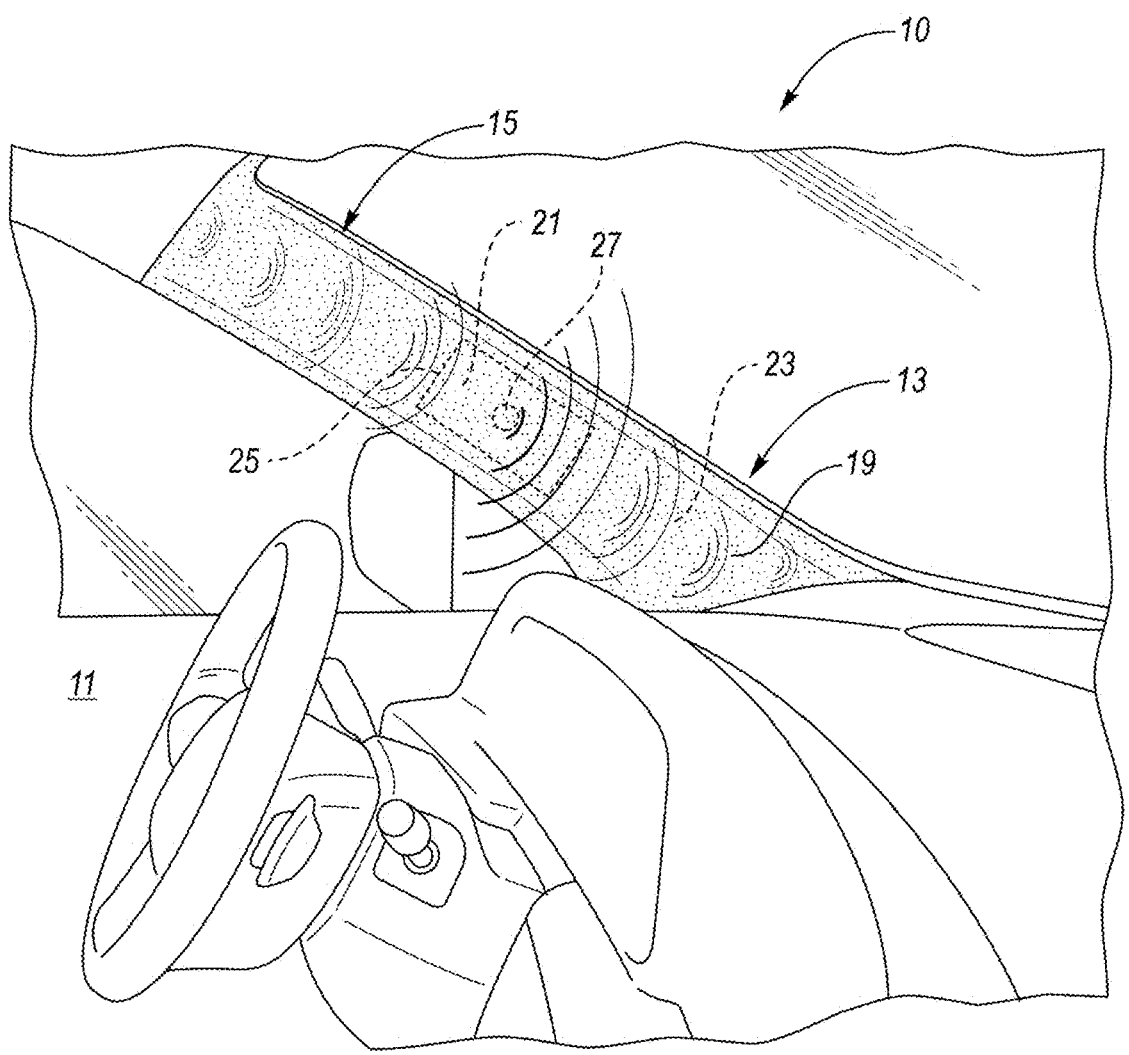
FIG. 1 is an environmental view, partially broken away, of a vibrating panel assembly configured to radiate sound in a passenger compartment of a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As used herein, the term "microperforations" may include circular and/or non-circular shaped micro-holes. The term "non-circular" may include any arbitrary shape that is not circular. The term "diameter" may be taken to mean the minimum distance across an opening of the microperforation at a point through the centroid of the microperforation, where the centroid and diameter are based on the area of the microperforation on a surface of the panel in which the microperforation is present. For example, when the microperforations are substantially circularly cylindrical, the diameter is the distance across the center of the circle defining the opening.

The openings of the microperforations may be non-circular such that the microperforation is not circularly cylindrical. In these cases, the "diameter" may be taken to mean the minimum distance across the non-circular opening of the microperforation that crosses through the centroid. The terms "hole" and "microperforation" are used interchangeably.

In some embodiments, the microperforations may be spaced (e.g., "pitch") between about 0.05 mm and 6 mm apart. In the case of non-uniform spaces, the pitch may be calculated as the average distance between microperforations if they are distributed evenly.

In some embodiments, the microperforations have a generally circular cross-section through the thickness of the panel. In some embodiments, the microperforations have a non-circular cross-section through the thickness of the panel. In some embodiments, the shape of the microperforation through a cross-section of a panel varies, or is substantially constant.

In some embodiments, the diameter is between 0.02 mm and 5 mm, between about 0.05 mm and 2 mm, between about 0.1 mm and 2 mm, between about 0.1 mm and about 1 mm, between about 0.1 mm and 0.6 mm.

As used in this application, the term "substrate" refers to any flexible, semi-flexible or rigid single or multi-layer component having a surface to which a decorative membrane is or can be applied. The substrate may be made of polymers and other plastics, as well as composite materials. Furthermore, the shape of the substrate and particularly the surface to be covered can be any part of an assembly or device manufactured by any of various methods, such as, without limitation, conventional molding, extruding, or otherwise fabricated.

The term "overlies" and cognate terms such as "overlying" and the like, when referring to the relationship of one or a first, superjacent layer relative to another or a second, subjacent layer, means that the first layer partially or completely lies over the second layer. The first, superjacent layer overlying the second, subjacent layer may or may not be in contact with the subjacent layer; one or more additional layers may be positioned between respective first and second, or superjacent and subjacent layers.

Referring now to FIG. 1, a vibrating panel assembly, generally indicated at 13, is configured to radiate sound into a passenger compartment 11 of a vehicle 10 having a support structure. The assembly 13 includes a substrate panel, generally indicated at 15 in FIG. 1 or 24 in FIG. 2, having front and back surfaces 28 and 26, respectively.

Figure 4:
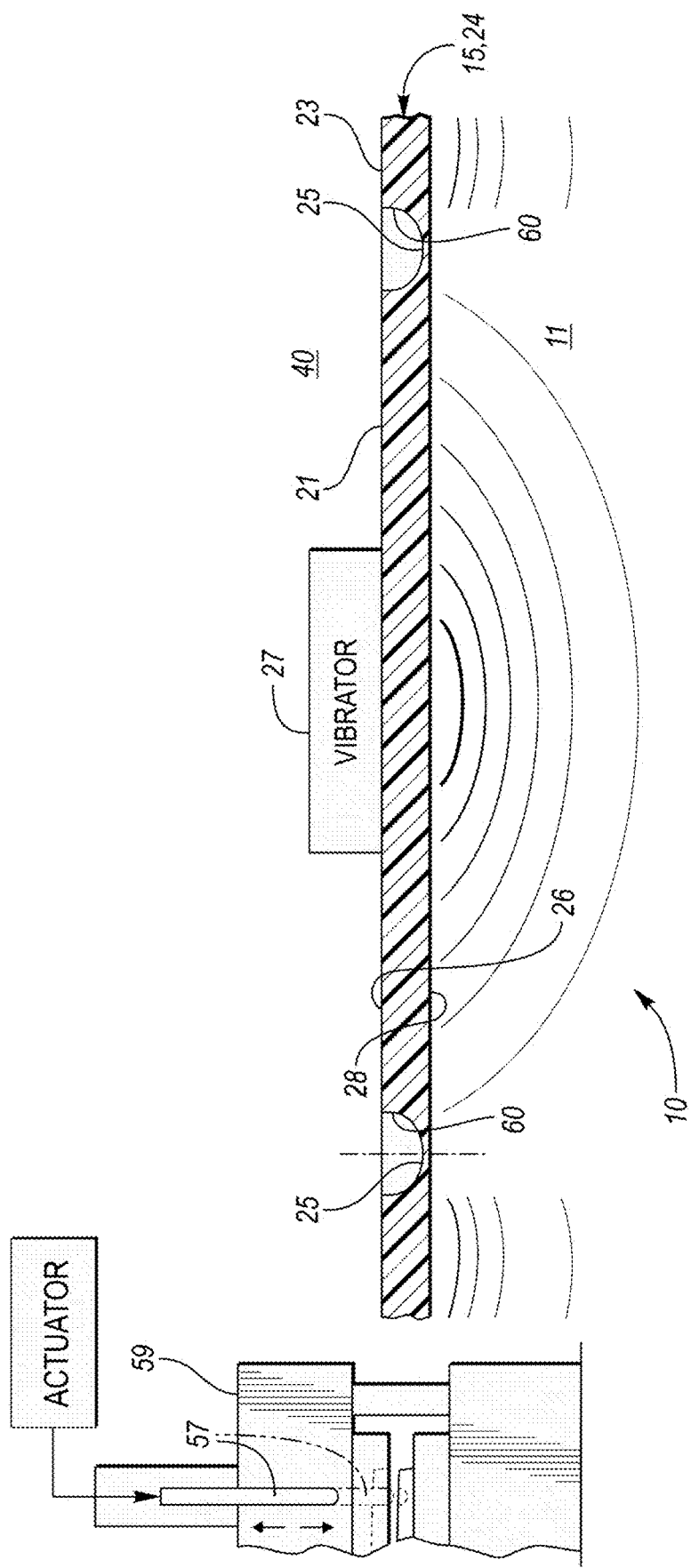
FIG. 4 is a side schematic view of an injection molding apparatus together with a side view, partially broken away and in cross section, of a vibrating panel assembly with a substantially continuous groove or line formed in the substrate panel and which defines an intermediate portion of the substrate panel.
Figure 11:
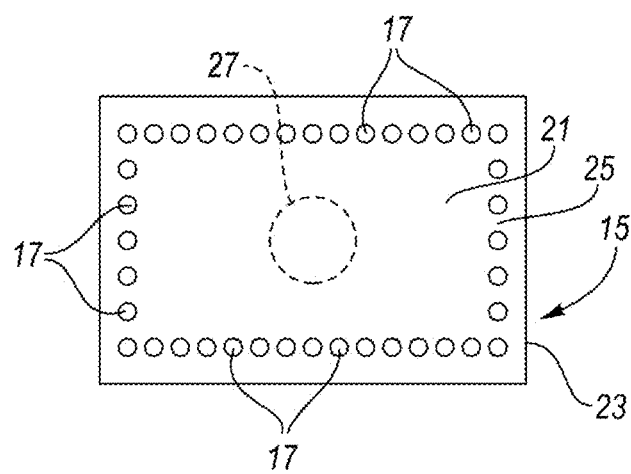
FIG. 11 is a top plan view of a substrate panel for use in a vibrating panel assembly wherein the panel has holes formed therethrough to form an intermediate portion of the panel.
Figure 12:
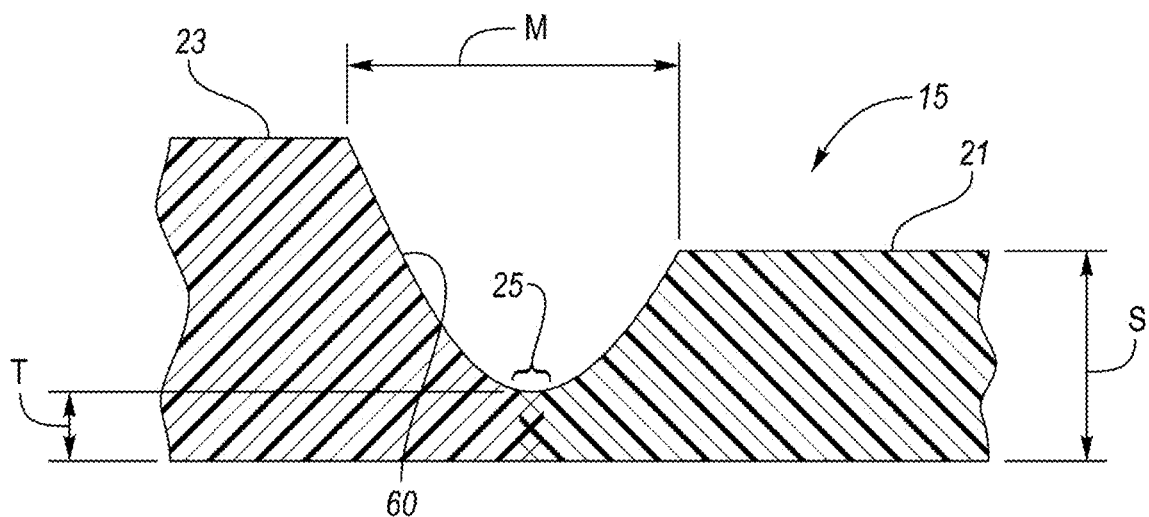
FIG. 12 is an enlarged, side view, partially broken away and in cross section, of a substrate panel for use in a vibrating panel assembly wherein different compatible plastics having different flexural modulus's are interbonded via polymeric interfusion at an intermediate portion of the panel; various dimensions of the resulting panel are shown.
Figure 13:
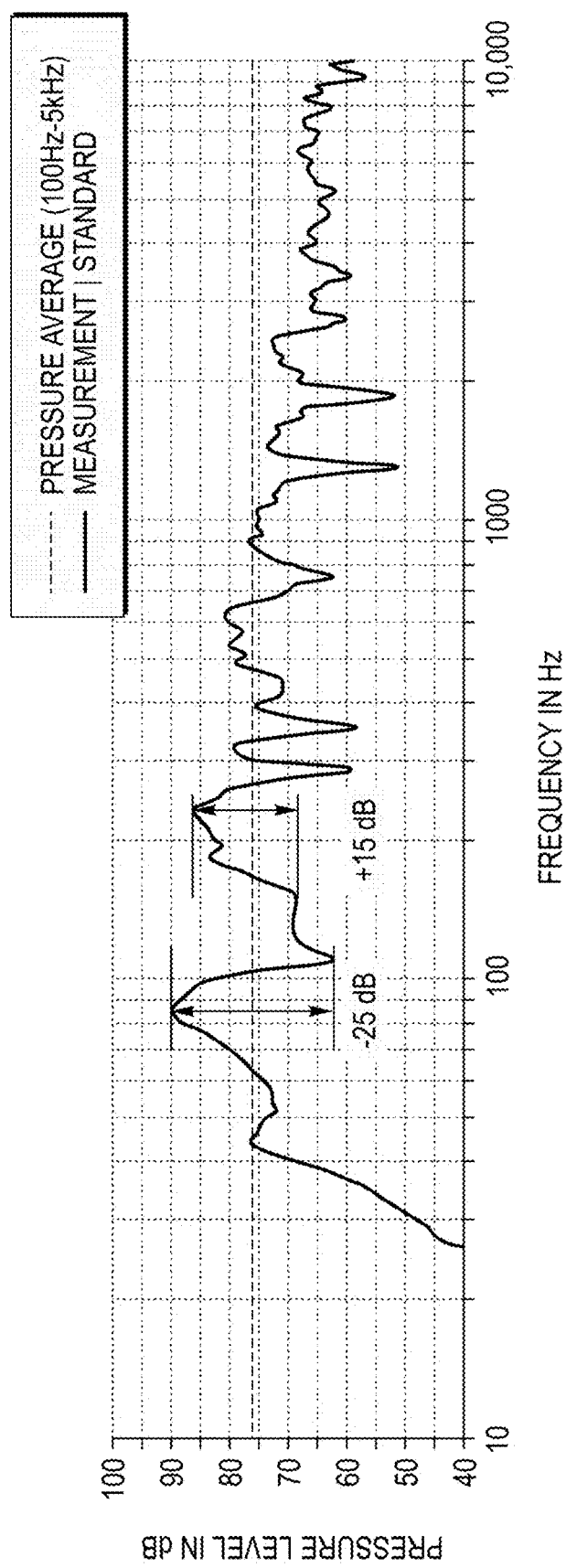
FIG. 13 is a graph of measured sound pressure level versus frequency (i.e. frequency response) for a typical flat-panel loudspeaker with high deviations from average acoustic pressure.
Figure 14:
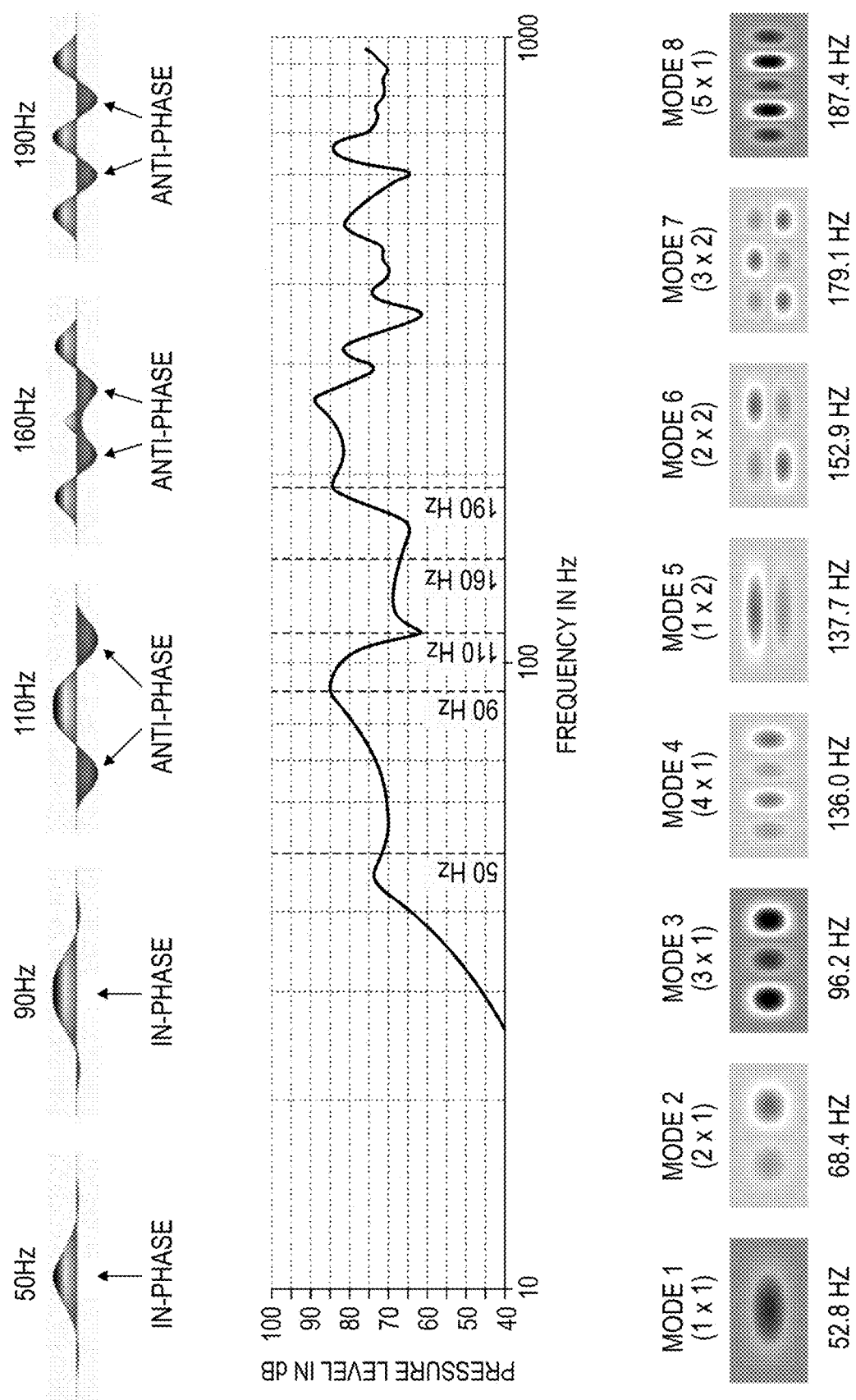
FIG. 14 is a graph, similar to the graph of FIG. 13, including various in-phase and anti-phase components of the vibrating panel shown at discrete frequencies within a low-frequency range (i.e. bass) at an upper portion of the Figure and including an overview of the relevant modes at discrete frequencies within the low-frequency range at a lower portion of the Figure.
Figure 15A:
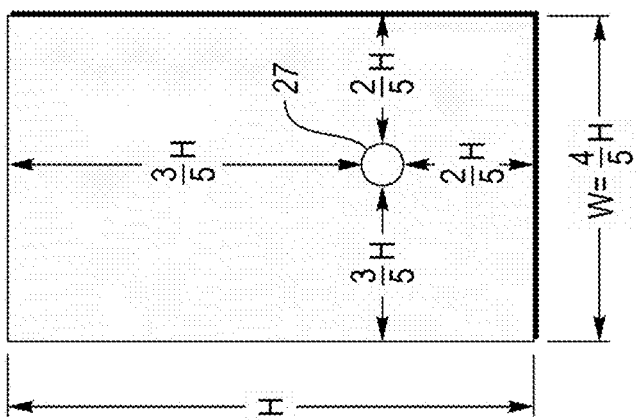
FIG. 15A-15D are schematic views showing possible exciter positions on the back of a panel for different numbers of exciters.
Figure 15B:
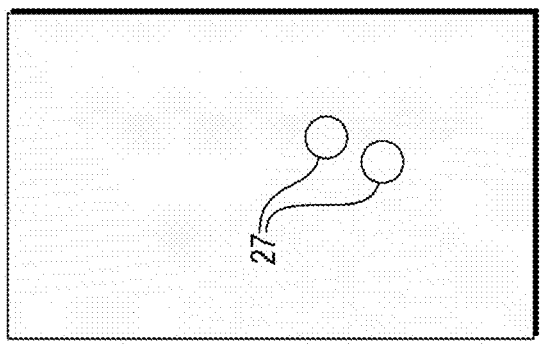
Figure 15C:
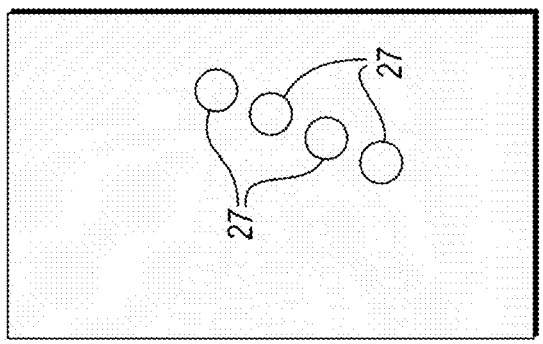
Figure 15D:
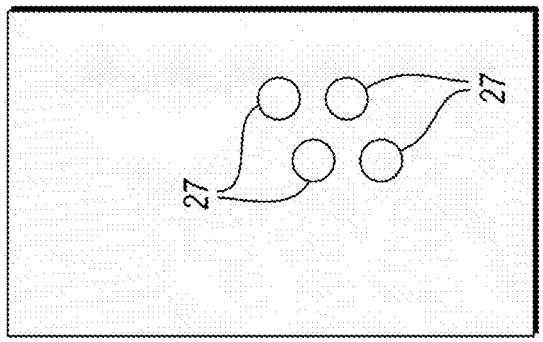

As shown in FIGS. 4, 11 and 12 (and FIG. 1 in phantom), the panels 15 and 24 include an inner portion 21, an outer boundary portion 23 formed on the perimeter of the panels 15 and 24 and an intermediate portion 25 between the inner portion 21 and outer boundary portion 23. The panels 15 and 24 are configured to be attached to the support structure of the vehicle 10. As shown in FIG. 14, the vibrating panels 15 and 24 have a frequency distribution of modes in a low frequency range (i.e. bass) of audible frequencies.

Figure 9:
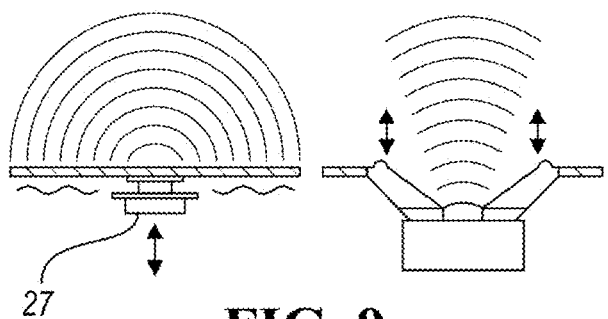
FIG. 9 is a top view of a pair of prior art panel assemblies for radiating sound.
Figure 10:
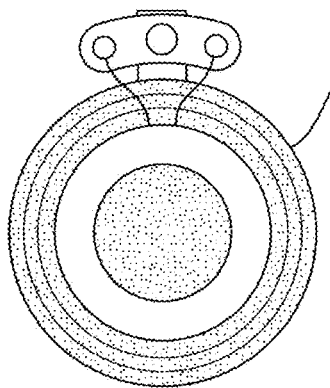
FIG. 10 is a top view of a prior art exciter to vibrate panels of assemblies of at least one embodiment of the present invention.

One or more electroacoustic vibrators such as a prior art exciters 27 of drawing FIGS. 9 and 10 are mounted on the inner portion 21 at the back surface of the panels 15 and 24 at a predetermined location(s) and is configured to vibrate the panels 15 and 24 over the range of audible frequencies in response to an electrical signal applied to the vibrators 27. The intermediate portion 25 is configured to increase modal density of the panels 15 and 24 thereby operating to flatten a low-frequency response of the panels 15 and 24. The intermediate portion 25 can be configured in a number of possible ways as described below to increase the modal density (i.e. modal behavior) of the panel. Parameters or properties of the intermediate portion 25 such as aspect ratio, material type, bending stiffness, thickness and geometry may be selected to enhance the distribution of modes (i.e. modal density) of the panel 15 or 24.

The panels 15 and 24 may be formed as unitary molded parts from at least one plastic. The panels 15 and 24 may be plastic molded panels. The plastic molded panels 15 and 24 may be injection molded.

As shown in the drawing Figures, the panels 15 and 24 may comprise automotive vehicle or other vehicle trim panels.

The panels 15 and 24 may be concavely formed and the back surface of the panels 15 and 24 may define a recess in which the one or more vibrators 27 are strategically positioned.

The panels 15 and 24 may be formed in a two-shot injection molding process and the inner portion 21 of the panels 15 and 24 may have a flexural modulus lower than the flexural modulus of the outer boundary portion 23. In this way, modal density of the panel is increased. The plastic of the intermediate portion 25 may be integrally formed via polymeric interfusion at an interface between the inner portion 21 and the plastic outer boundary portion 23. The plastics are compatible in such multi-material molding. Alternatively, a flexible layer of material may be formed about the outer perimeter of the boundary portion 23 (i.e. compliantly suspended panel edges as shown in FIGS. 16E and 16F) to isolate the panels 15 and 24 from the vehicle support structure.

Figure 2:
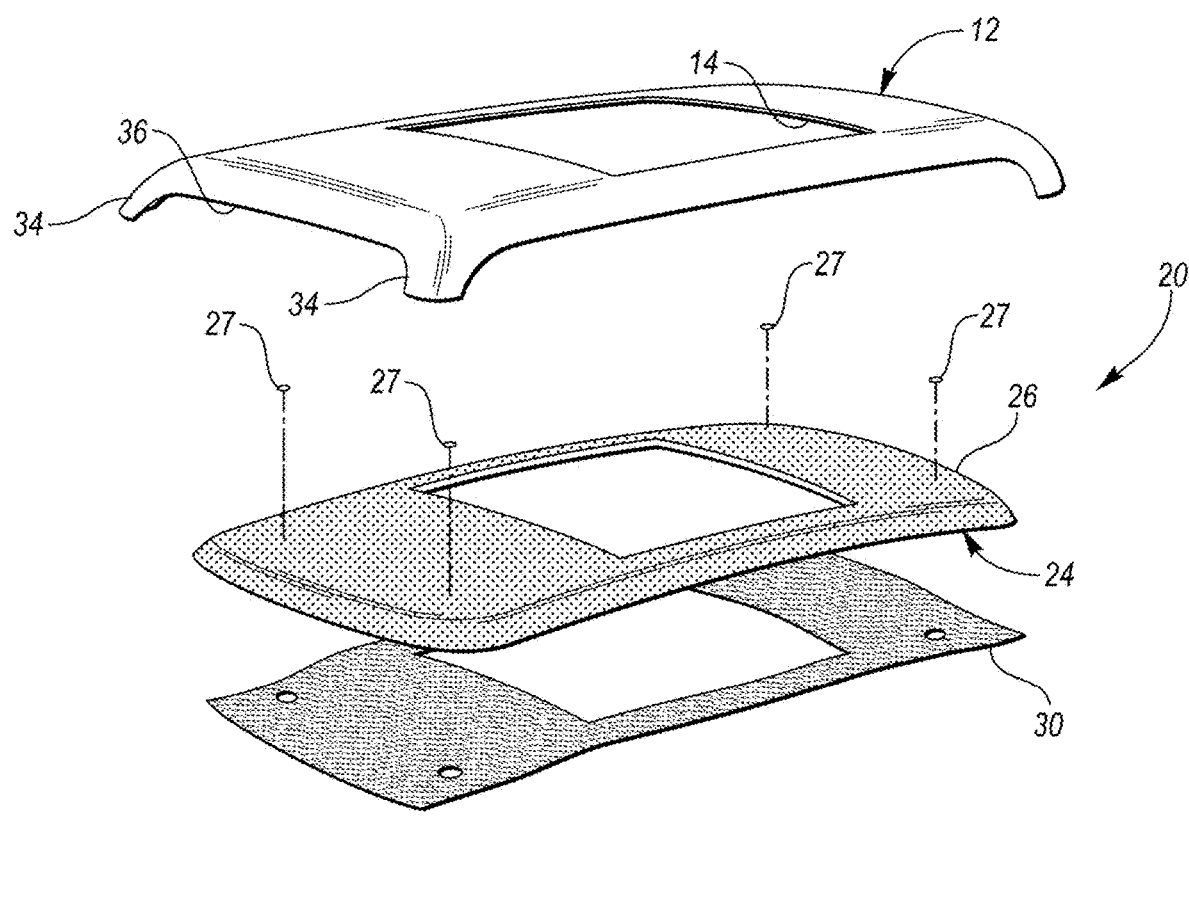
FIG. 2 is an exploded perspective view of a vibrating panel assembly wherein a substrate panel of the assembly is configured to be attached to a roof of a vehicle support structure.

Referring to FIGS. 1 and 2, the panels 15 and 24 may be configured to be attached to a pillar portion 34 and a roof 12, respectively, of the vehicle support structure.

In one embodiment, the intermediate portion 25 may be made of an elastomeric material so that the inner portion 21 acts like a trampoline-like structure with the intermediate portion 25 acting as a spring-like structure. In this way, modal density is increased thereby changing modal behavior of the panel.

In another embodiment, the intermediate portion 25 may be scored with a plurality of slits 21 via one or more cutters 57 of a molding apparatus 59 of FIG. 4. In this way, modal density is increased.

As shown in the enlarged view of FIG. 12, the intermediate portion 25 may form a living hinge of reduced thickness between the plastic inner portion 21 and the plastic outer boundary portion 23. The two plastics are compatible and are interbonded via polymeric interfusion at the intermediate portion 25. The inner portion 21 may have a flexural modulus lower than the flexural modulus of the boundary portion 23. Example dimensions include S=1.25 to 2 mm; M=1.5 to 3.5 mm; and t=0.5 to 1.0 mm. The living hinge increases the modal density of the panels 15 and 24 by changing the modal behavior of the panels.

The intermediate portion 25 may be formed via plastic molding, routering, machining, laser, cutting, peening, etc. For example, the intermediate portion 25 may be formed by an injection molding apparatus, generally of the type disclosed in U.S. Pat. No. 5,776,522 and which has an insert which is movable in a mold cavity to form the intermediate portion 25.

As shown in FIGS. 4, 5A, 5B and 11, the intermediate portion 25 of the panels 15 and 24 may be perforated with a plurality of holes or grooves 60 or 17 which may or may not extend completely through the panels 15 and 24 to increase the modal density of the panels 15 and 24.

The assembly 13 may further comprise a continuous layer 19 or 30 of facing material overlying and in contact with the front surface of the panel 15. The facing material may include leather, vinyl, plastic, fabric, nylon, etc.

The panels 15 and 24 may be configured to be attached to a door (FIGS. 6 and 7) of the support structure.

The panel 24 may be configured to be attached to the roof 12 (FIG. 2) of the support structure.

The panels 18 and 24 may be made of a thermoplastic or other plastic material. For example, the panels 18 and 24 may be made of a material such as a polycarbonate resin containing acrylonitrile, butadiene, and styrene (PC-ABS) material, thermoplastic elastomer etherether (TEEE), polypropylene, the product having the trade name Santoprene™ supplied by Monsanto Company, or a thermoplastic polyolefinic (TPO) material.

Figure 3:
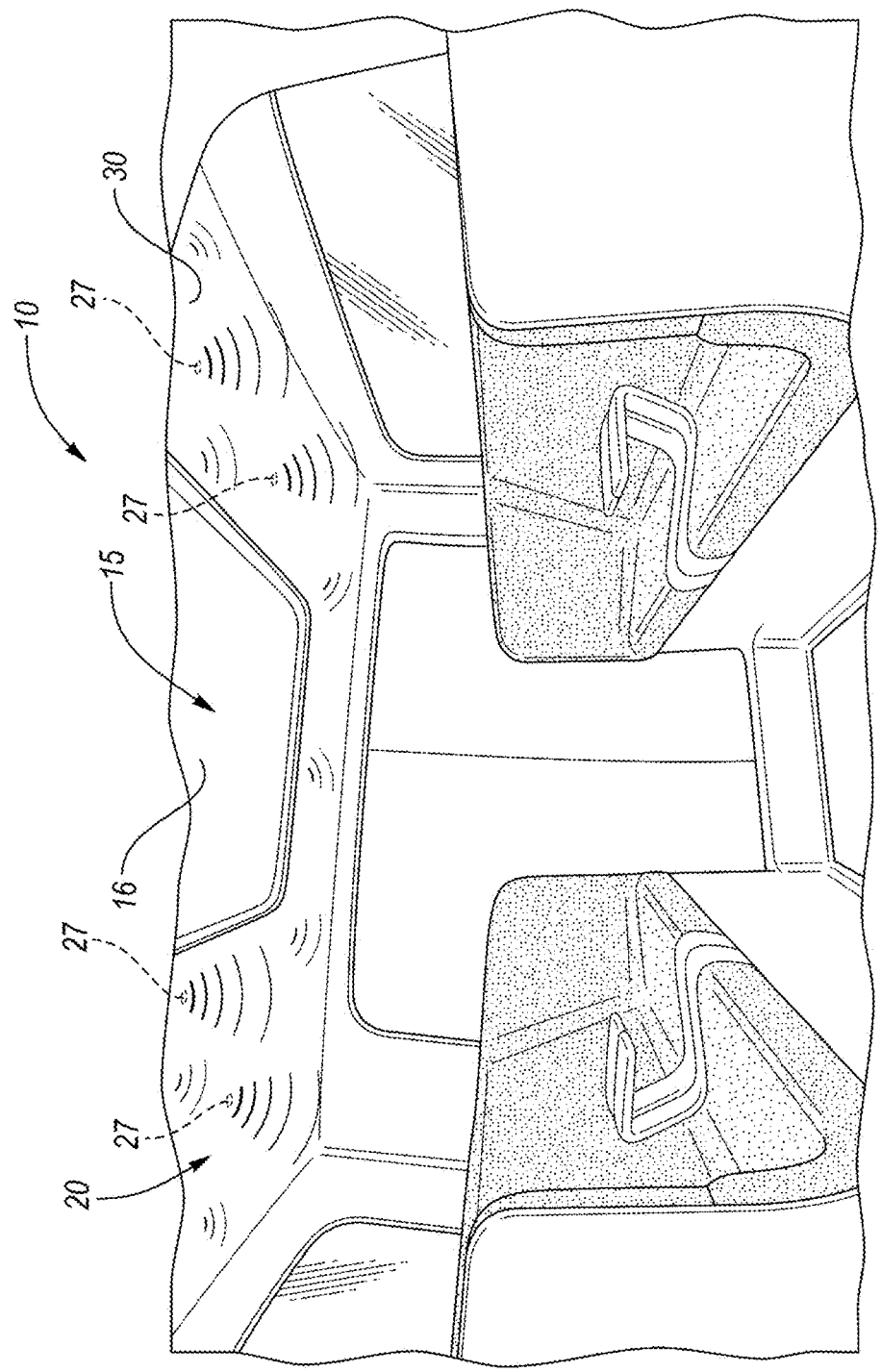
FIG. 3 is an environmental view, partially broken away, of another vibrating panel assembly configured to radiate sound into a passenger compartment of an autonomous vehicle.

The vehicles 10 of FIGS. 1 and 3 are illustrative of any type of automobile or other vehicle in which at least one embodiment of the present invention can be used. For example, the vehicles 10 may include, but is not limited to cars, trucks, SUVs, semi-trucks, tractors, planes, boats, trains, etc.

The roof 12 of the autonomous vehicle 10 of FIGS. 2 and 3 forms part of the support structure of the vehicle 10 and covers the passenger compartment 11 in which passengers or occupants of the vehicle 10 ride.

The roof 12 may include a moonroof opening 14. For purposes of this description, the terms sunroof and moonroof are used interchangeably, such that the moonroof opening 14 may alternatively be referred to as a sunroof opening. A moonroof assembly, generally indicated at 15, fills the moonroof opening 14 and some of the adjacent structure of the roof 12. The moonroof assembly 15 facilities sliding, tilting, or other movement of a glass or opaque panel 16 that selectively covers the moonroof opening 14.

The roof 12 is bounded by a windshield or windscreen 18 at a forward position of the vehicle 10, relative to the direction of travel. Similarly, the roof 12 generally terminates at a similar window or windscreen at a rearward portion of the vehicle 10. The windscreen 18 and the windscreen at the rear may be different in production vehicles.

The low-profile panel assembly 13 is configured to radiate sound into the passenger compartment 11 of the vehicle 10 of FIG. 1. The assembly 13 includes the substrate panel 15, which may be perforated with a two-dimensional array of closely-spaced holes 17 which extend between front and back surfaces of the panel 15.

The assembly 13 may include a continuous membrane, generally indicated at 19, of facing material overlying and in contact with the panel 15. The membrane 19 is tightly stretched over the panel 15 at its front surface. The membrane 19 is typically sound emitting. The membrane 19 may be made of leather and may be naturally porous.

A headliner or panel assembly, generally indicated at 20 in FIGS. 2 and 3, sits below the roof 12 and includes components providing a functional and an aesthetic barrier between the roof 12 and the passenger compartment 11. The headliner assembly 20 includes multiple components and may also be referred to as a headliner or vibrating panel assembly.

Figure 5A:
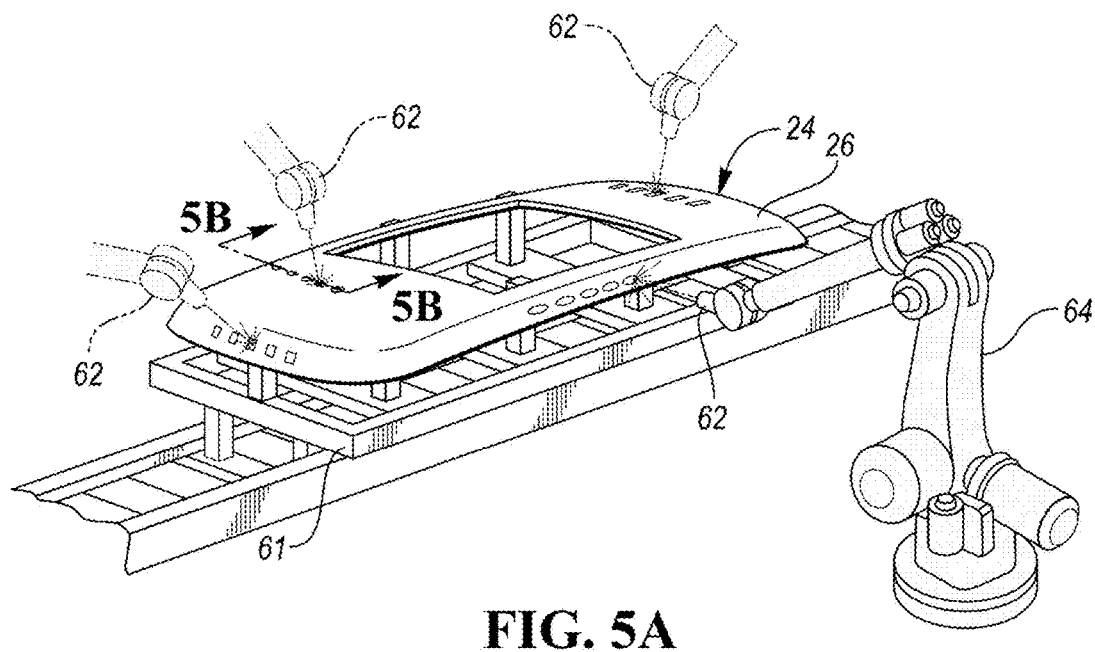
FIG. 5A is a schematic view, partially broken away, of a laser robot drilling holes in the substrate panel of FIG. 2 supported on a fixture wherein different positions of the laser are illustrated in phantom.
Figure 5B:
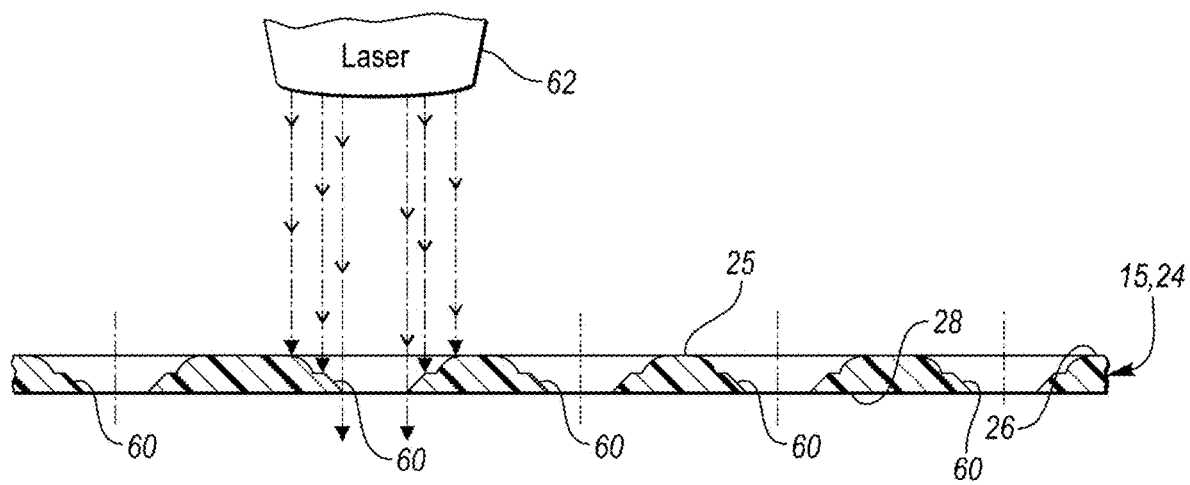
FIG. 5B is a view, partially broken away and in cross section, taken along lines 5B-5B in FIG. 5A.

The headliner 20 is preferably, a lightweight, thermoplastic headliner, constructed in accordance with at least one embodiment of the present invention. The headliner 20 includes the stiff, self-supporting, substrate panel or thermoplastic sheet 24, which is adapted to be mounted adjacent the roof 12 so as to underlie the roof 12 and shield the roof 12 from view. Like the panel 15, the sheet or panel 24 has an upper surface or face 26 and a lower surface or face 28 (FIGS. 2, 4 and 5B).

The headliner 20 may be attached to the vehicle roof 12 of the vehicle support structure by double-sided tape or a heat-activated adhesive. Alternatively, the upper surface 26 of the thermoplastic sheet 24 may be provided with integrally formed fasteners (not shown) to fasten the headliner 20 to complementarily-formed fasteners (not shown) formed on the lower surface of the vehicle roof 12.

The thermoplastic resin of the thermoplastic sheet 24, as well as the panel 15, may be TPO, ABS, PC/ABS, or polypropylene with a mold-in color. The thermoplastic sheet 24 and the panel 15 are stiff and self-supporting, yet the sheet 24 is flexible enough to bend slightly so that the headliner 20 can be inserted between two spaced apart A-pillars 34 of the vehicle roof 12 which help to define a front windshield opening 36. (The panel 15 is configured to be attached to one of A-pillars 34). The substrate 24 and the panel 15 are dimensionally stable and may be formed from other materials such as hard foam, plastic, wood, or composites.

A continuous membrane of facing material or cover 30 of the headliner 20 has an A-surface and covers the substrate 24 and spans substantially the entire headliner 20. The cover 30 overlies and is in contact with the substrate panel 24. The cover 30 is typically tightly stretched over the front surface 26 at the panel 24. The cover stock or cover 30 may be formed by bonding a decorative, textile sheet or fabric to the substrate 24 to give the headliner 20 a soft, padded feel. The cover stock 30 may be a single material which is both flexible and has an aesthetically pleasing tactile surface such as leather. The cover stock 30 is wrapped, pulled, and adhered over the substrate 24. The cover stock 30 may be compressible and flexible, such that the cover stock 30 may be bent or pulled around tight corners and may have a variable thickness depending upon the assembly process.

FIG. 4 illustrates injection molding of the substrate panels 15 and 24 by molding apparatus 59 to form holes or grooves 60 in the substrate panels 15 and 24. The holes or grooves 60 may be formed by plastic molding, routering, scoring machining, laser, cutting, preening, etc. If a laser is used to form the holes 60, the panels 15 and 24 are held by a fixture 61 (for the substrate panel 24) using a laser 62 mounted as an end effecter at the distal end of the arm of a robot 64 as shown in FIG. 5A. It is to be understood that the laser 62 typically includes a lens to provide focused beams of laser energy to drill the funnel-shaped holes 60 of FIG. 5B or the cylindrical holes 60 of FIG. 4. Also, the panel 15 may be held by a fixture (not shown) so that the laser-robot 64 can laser-drill the holes 60 therein.

Figure 6:
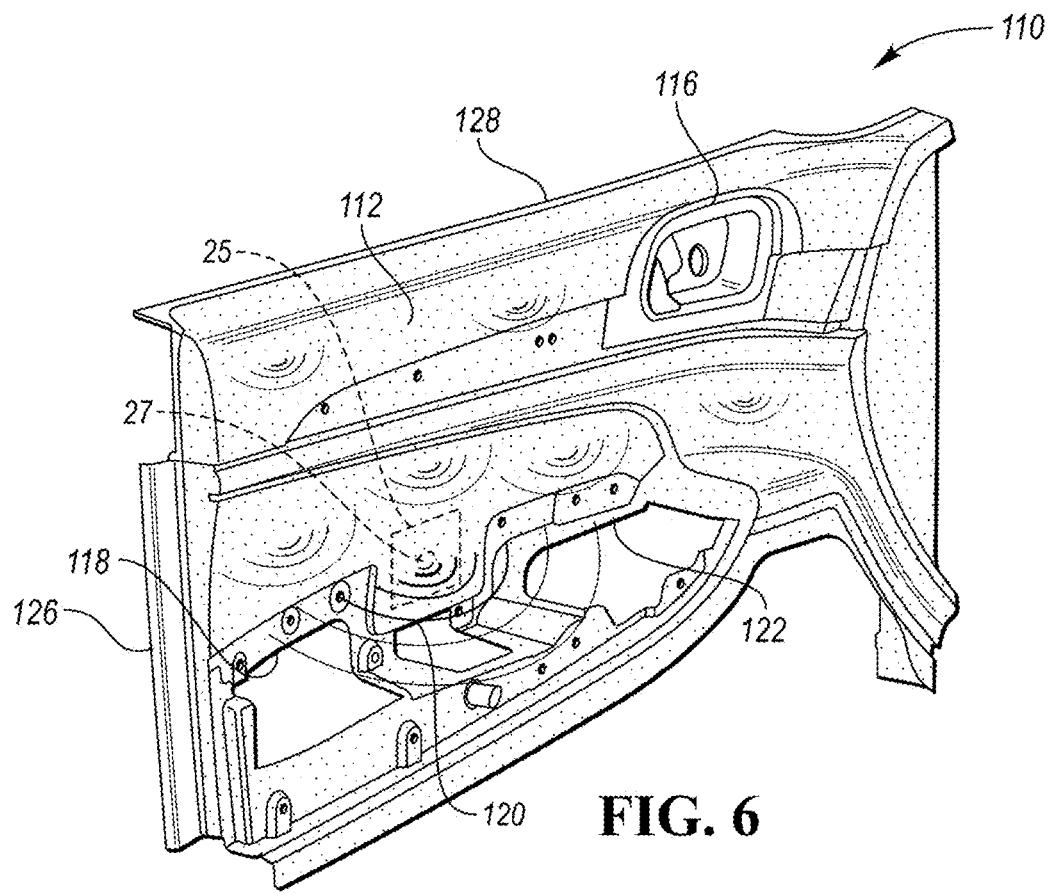
FIG. 6 is a schematic front view of a door panel assembly constructed in accordance with at least one embodiment of the present invention.
Figure 7:
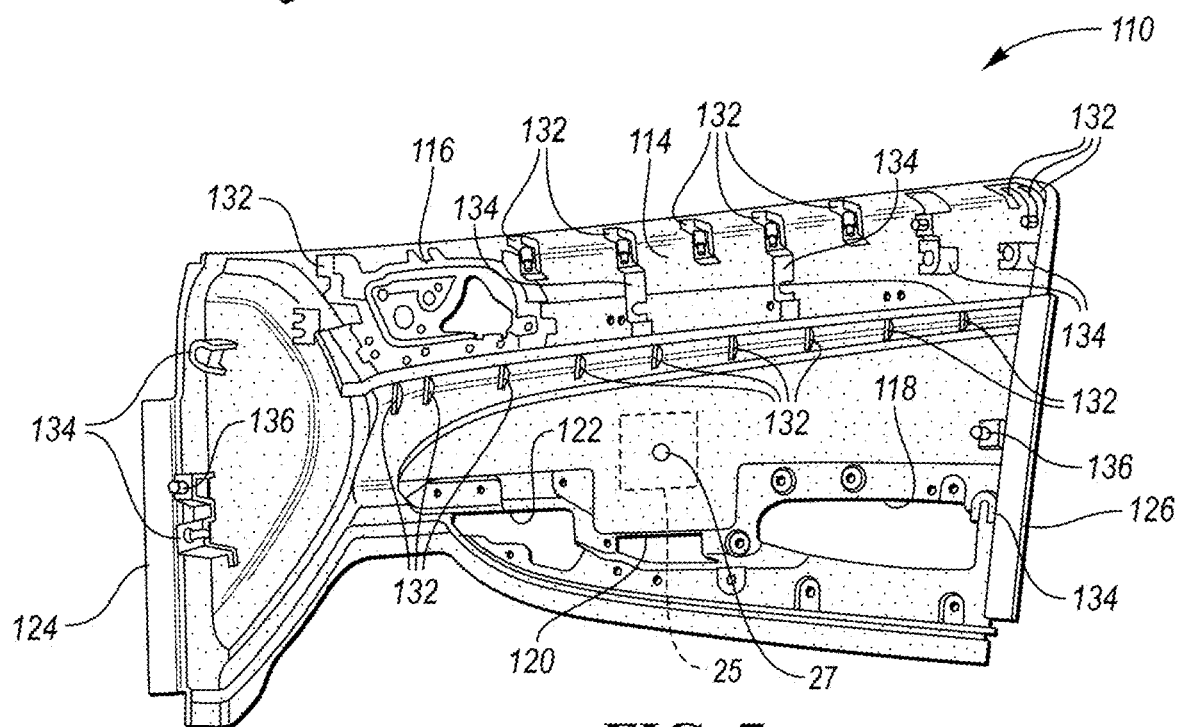
FIG. 7 is a back view of the panel assembly of FIG. 6.

At least one embodiment of the present invention comprises a laminated trim component, such as vehicle trim component or upper interior door panel assembly, generally indicated at 110 in FIGS. 6 and 7. The panel 110 has an inner "A" surface 112 and an outer "B" surface 114. The panel 10 includes a number of apertures 116, 118, 120 and 122 which receive and retain a number of different automotive components. The panel 110 includes a plurality of edge components 124, 126 and 128 which are made from plastic resin which initially flows from "drops" (not shown) to stiffening ribs 132, receptacles 134 and posts 136 to provide attachment locations for various automotive components including wiring harnesses, etc. on the "B" surface 114 of the panel 110. The intermediate portion 25 shown in the various drawing figures may be cut, molded, drilled, scored or otherwise laser-processed to increase the modal density of the panel 110.

The laminated sheet or panel 110 may be scored by the cutters of the molding apparatus 59. Scoring may be accomplished by the cutting blades 57 of the cutters mounted for translational movement in an upper mold half of the molding apparatus 59. The blades are moved by an actuator under control of a controller. Such scoring in the intermediate portion 25 increase the modal density of the panel 110.

Instead of cutting blades 57 in the injection molding apparatus 59, one or more inserts having a shape defining the intermediate portion 25 may be extended into the mold cavity before the molten resin therein completely solidifies. The insert is extended into the mold cavity in the closed position of the mold to displace plastic at the location(s) defining the intermediate portion 25. The plastic may be displaced along a substantially continuous line or groove as shown in U.S. Pat. No. 5,776,522.

Figure 8:
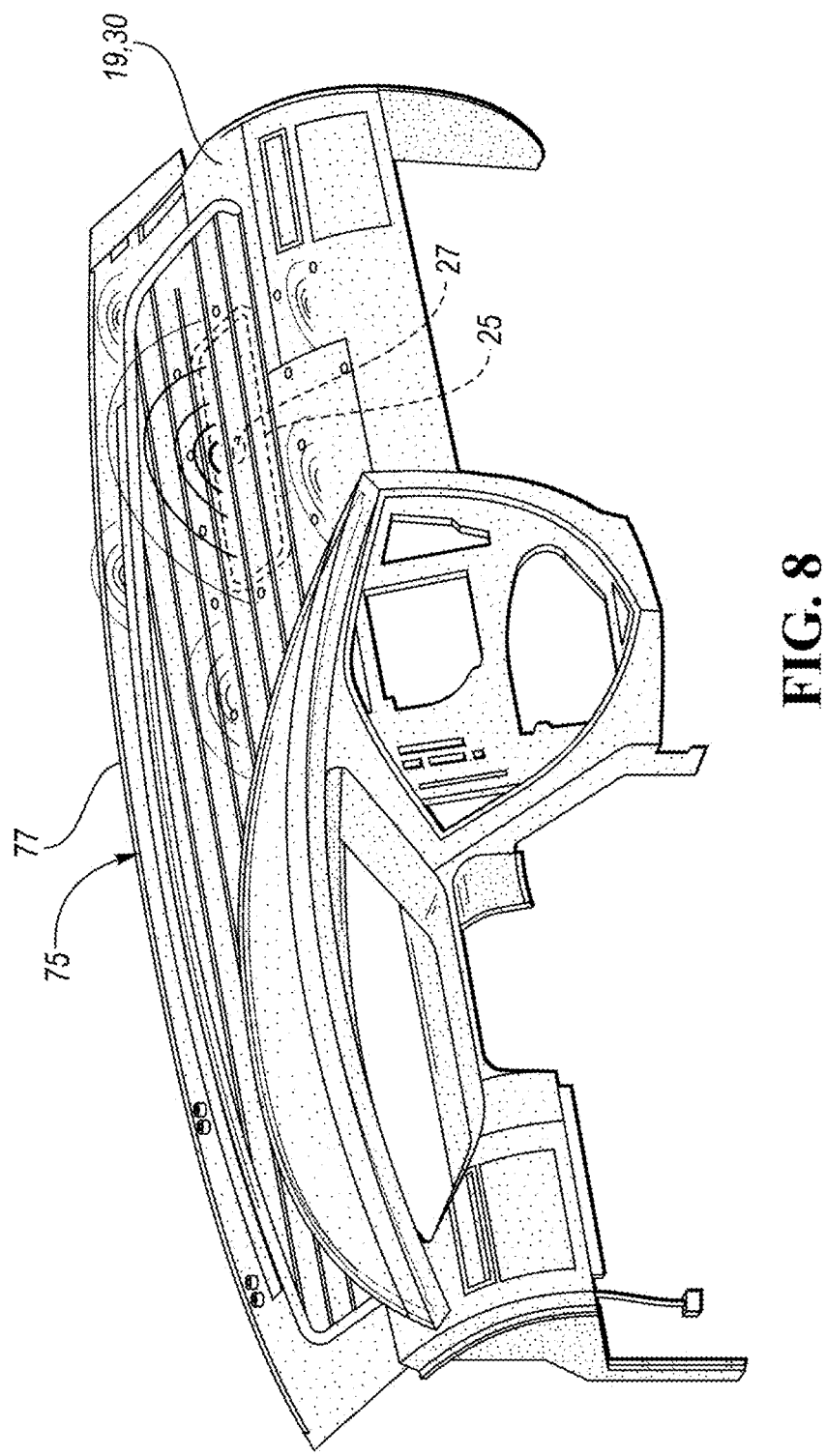
FIG. 8 is a front perspective view of an instrument panel of a vibrating panel assembly constructed in accordance with an embodiment of the present invention.

FIG. 8 illustrates a panel assembly, generally indicated at 75, comprising an exciter 27 (in hidden lines) and an intermediate portion 25 of a substrate panel 77 constructed in accordance with the present invention. The exciter 27 cooperates with panel 77 to emit sound into a compartment of a vehicle. As shown, the panel 77 may comprise a vehicle's front panel member having an outer show or "A" surface provided by a facing material 19 or 30. The intermediate portion 25 may be scored, drilled or cut to increase the modal density of the panel 77.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vibrating panel assembly configured to radiate sound into a passenger compartment of a vehicle having a support structure, the assembly comprising:

a substrate panel having front and back surfaces, the panel including an inner portion, an outer boundary portion formed on the perimeter of the panel and an intermediate portion between the inner portion and outer boundary portion, the vibrating panel having a frequency distribution of modes in a range of audible frequencies, the panel being configured to be attached to the support structure; and an electroacoustic vibrator mounted on the inner portion at the back surface of the panel at a predetermined location and configured to vibrate the panel over the range of audible frequencies in response to an electrical signal applied to the vibrator, wherein the intermediate portion is configured to increase modal density of the panel, wherein the panel is formed as a unitary molded part from at least one plastic; and wherein the inner portion of the panel has a flexural modulus lower than the flexural modulus of the outer boundary portion and wherein the intermediate portion is integrally formed via polymeric interfusion at an interface between the inner portion and outer boundary portion.

2. The assembly as claimed in claim 1, wherein the panel is a plastic molded panel.

3. The assembly as claimed in claim 2, wherein the plastic molded panel is injection molded.

4. The assembly as claimed in claim 1, wherein the panel comprises an automotive vehicle trim panel.

5. The assembly as claimed in claim 1, wherein the panel is concavely formed and the back surface of the panel defines a recess in which the vibrator is disposed.

6. The assembly as claimed in claim 1, wherein the vibrator comprises an exciter.

7. The assembly as claimed in claim 1, wherein the panel is configured to be attached to a pillar of the support structure.

8. The assembly as claimed in claim 1, wherein the intermediate portion is made of an elastomeric material.

9. The assembly as claimed in claim 1, wherein the intermediate portion is scored with a plurality of slits.

10. The assembly as claimed in claim 1, wherein the intermediate portion is a substantially continuous line or groove which has a thickness less than the thickness of either the inner portion or the outer boundary portion.

11. The assembly as claimed in claim 1, wherein the intermediate portion of the panel is perforated with a plurality of holes.

12. The assembly as claimed in claim 1, further comprising a continuous layer of facing material overlying and in contact with the front surface of the panel.

13. The assembly as claimed in claim 12, wherein the facing material includes leather, vinyl, plastic, fabric or nylon.

14. The assembly as claimed in claim 1, wherein the panel is configured to be attached to a door of the support structure.

15. The assembly as claimed in claim 1, wherein the panel is configured to be attached to a roof of the support structure.

16. The assembly as claimed in claim 1, further comprising a continuous layer of facing material overlying the front surface of the panel.

17. A vibrating panel assembly configured to radiate sound into a passenger compartment of a vehicle having a support structure, the assembly comprising:

a plastic substrate panel having front and back surfaces, the panel including a plurality of inner portions, an outer boundary portion formed on the perimeter of the panel and intermediate portions between each inner portion and outer boundary portion, the vibrating panel having a frequency distribution of modes in a range of audible frequencies, the panel being configured to be attached to the support structure; and an array of electroacoustic vibrators mounted on the inner portions at the back surface of the panel at predetermined locations and configured to vibrate the inner portions over the range of audible frequencies in response to electrical signals applied to the vibrators, wherein the intermediate portions are configured to increase modal density of the panel; and wherein the inner portion of the panel has a flexural modulus lower than the flexural modulus of the outer boundary portion and wherein the intermediate portion is integrally formed via polymeric interfusion at an interface between the inner portion and outer boundary portion.

18. A vibrating panel assembly configured to radiate sound into a passenger compartment of a vehicle having a support structure, the assembly comprising:

a plastic substrate panel having front and back surfaces, the panel including an inner portion, an outer boundary portion formed on the perimeter of the panel and an intermediate portion between the inner portion and outer boundary portion, the vibrating panel having a frequency distribution of modes in a range of audible frequencies, the panel being configured to be attached to the support structure;

a continuous layer of facing material overlying and in contact with the front surface of the panel; and an electroacoustic vibrator mounted on the inner portion at the back surface of the panel at a predetermined location and configured to vibrate the panel over the range of audible frequencies in response to an electrical signal applied to the vibrator, wherein the intermediate portion is configured to increase modal density of the panel; and wherein the inner portion of the panel has a flexural modulus lower than the flexural modulus of the outer boundary portion and wherein the intermediate portion is integrally formed via polymeric interfusion at an interface between the inner portion and outer boundary portion.

* * * * *